Patented Jan. 16, 1934

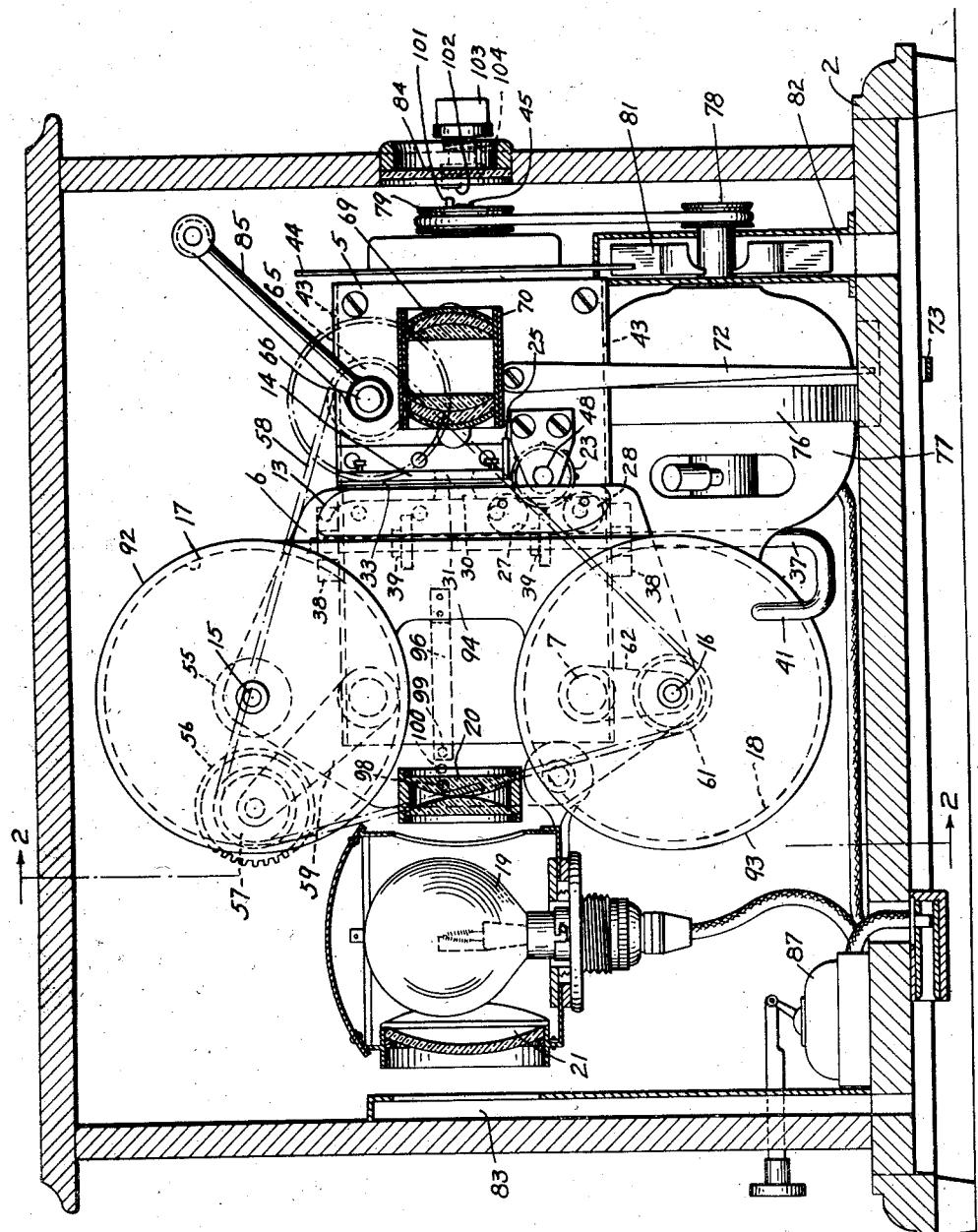

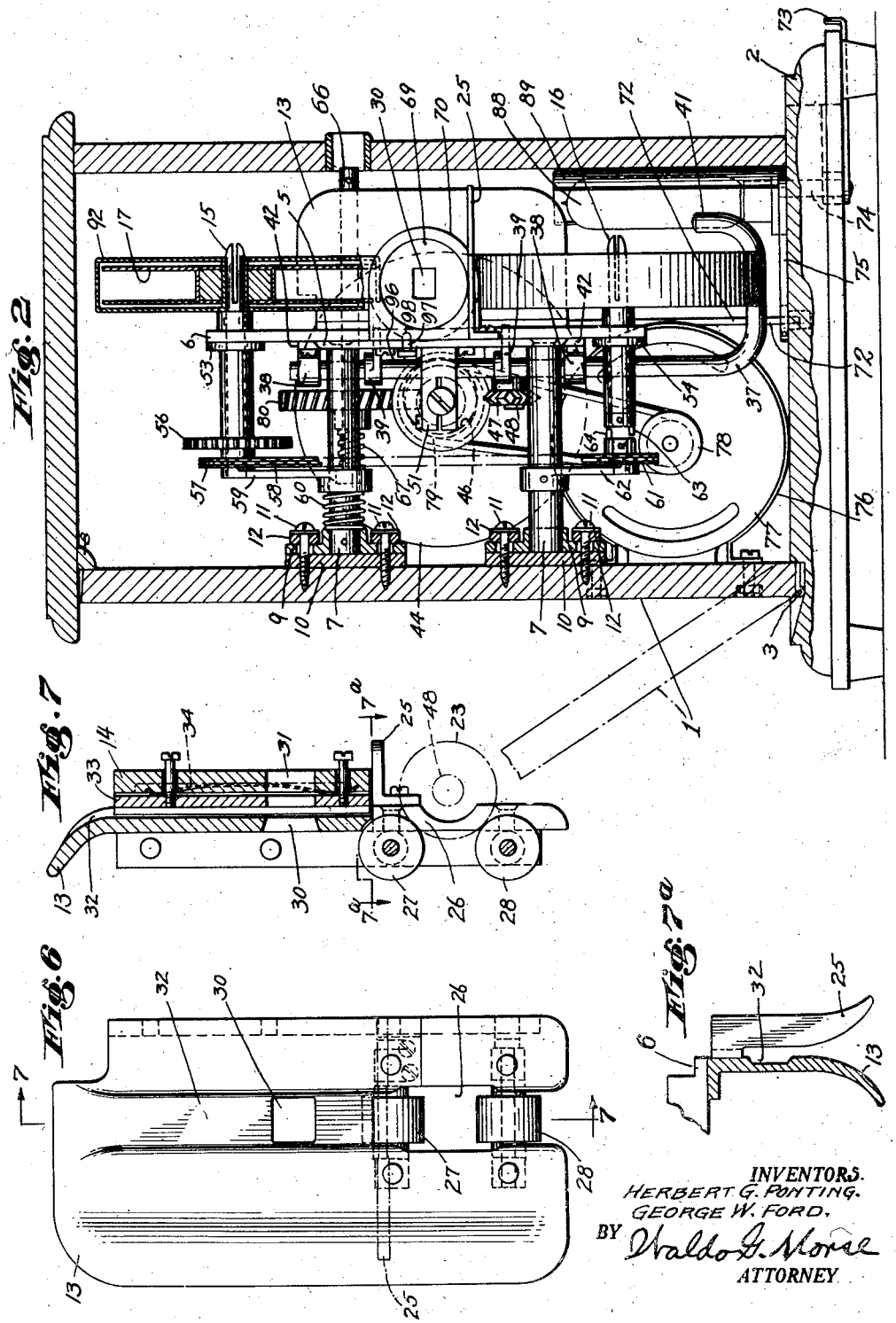

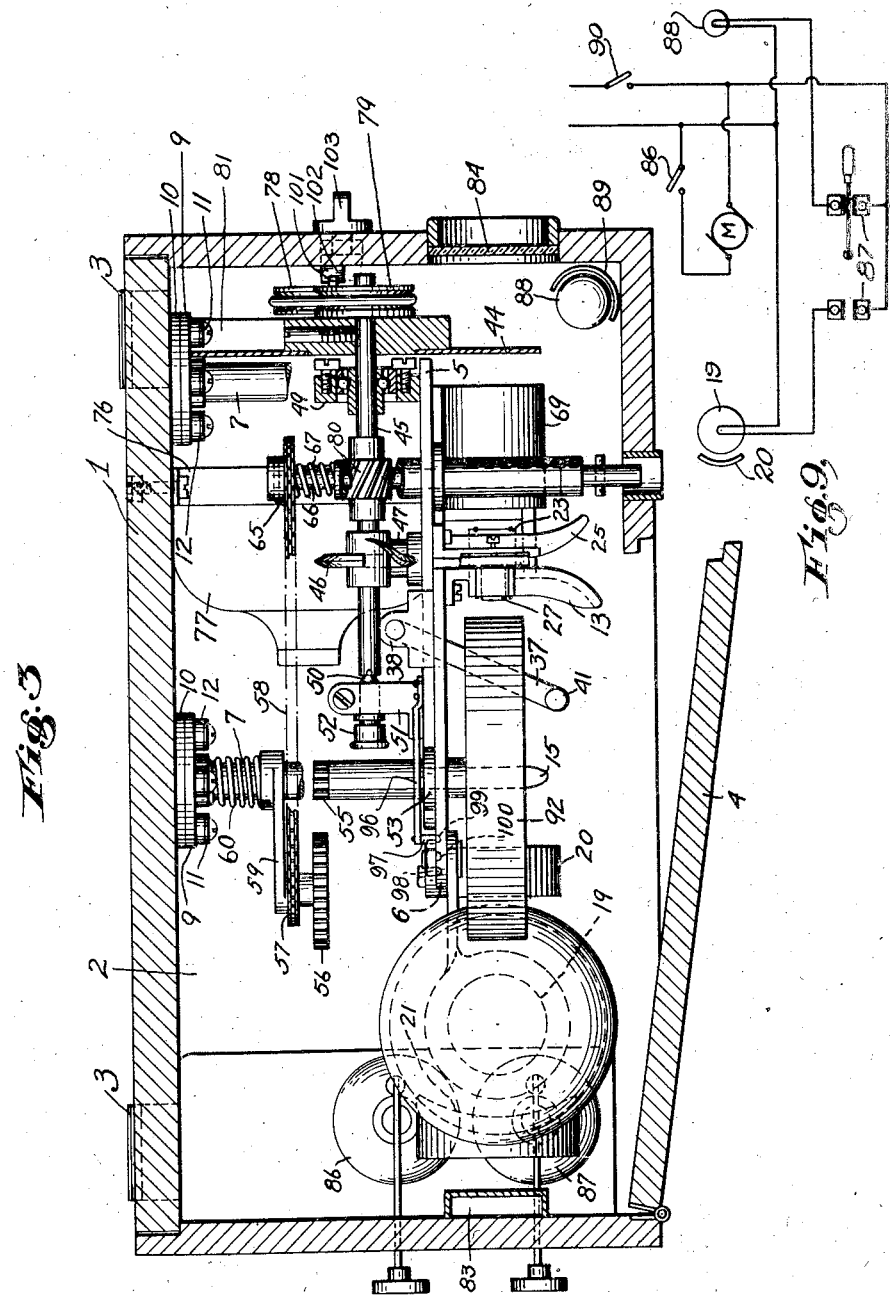

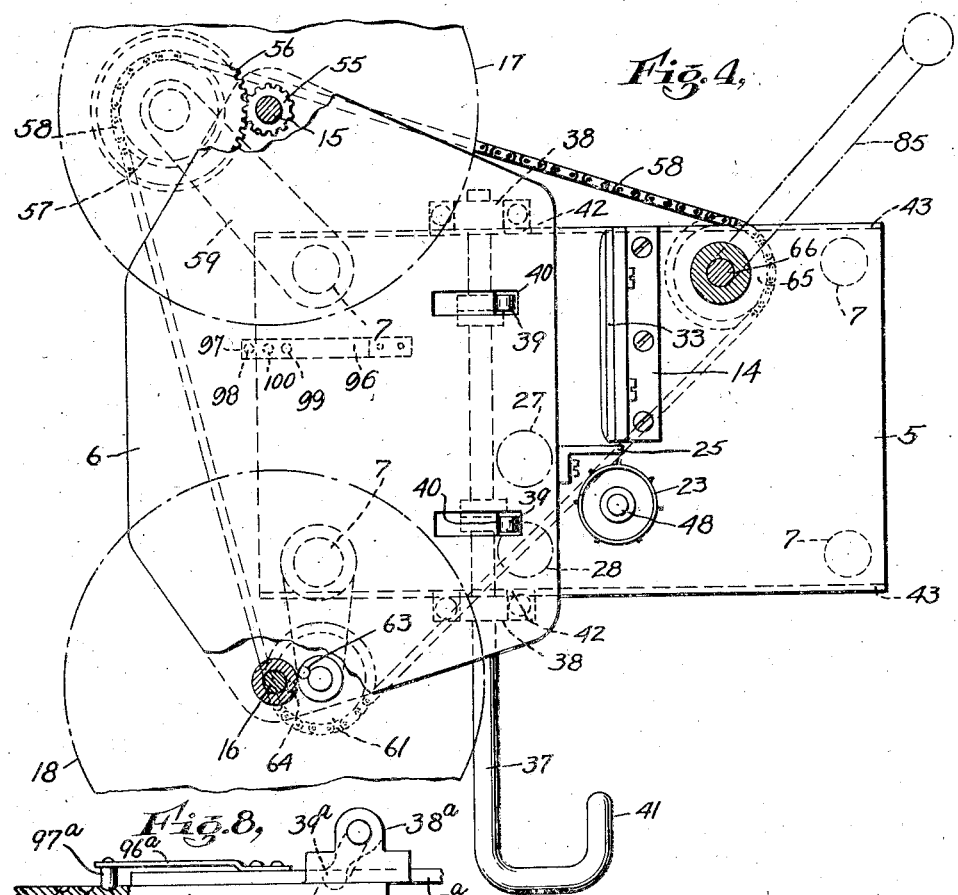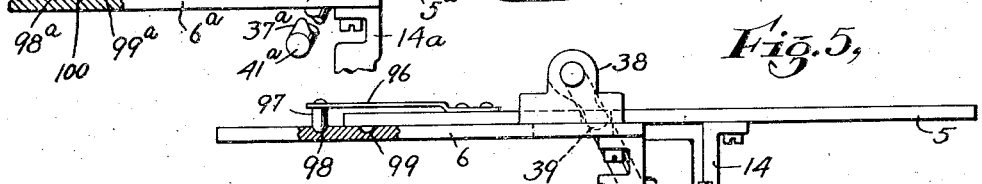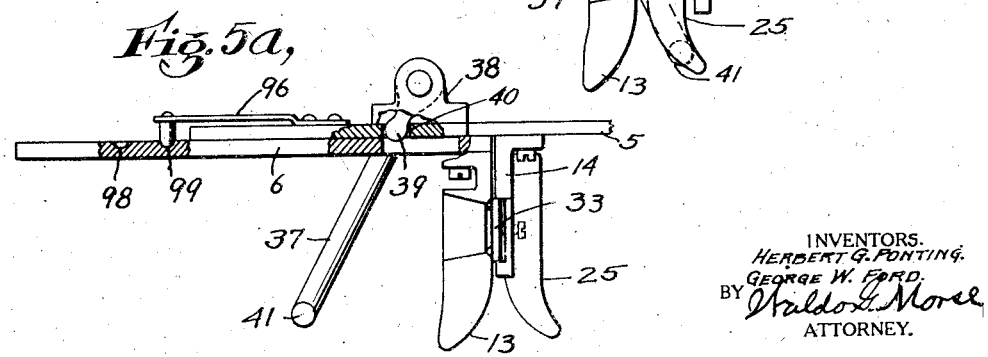

1,944,032

UNITED STATES PATENT OFFICE 1,944,032

FILM HANDLING APPARATUS

Herbert George Ponting, Oxford Circus, London, and George William Ford, Kensington, London, England, assignors, by mesne assignments, to Kinatome Patents Corporation Application September 16, 1929
Serial No. 392,889

13 Claims. (Cl. 88—17)

This application is a continuation in part of our co-pending application, Serial Number 542,-898, now Patent Number 1,868,252, filed in the United States Patent Office March 11, 1922, in the British Patent Office March 30, 1921; France March 3, 1922; Germany March 25, 1922; Belgium March 29, 1922; Switzerland March 29, 1922; Sweden March 30, 1922; and in the Dominion of Canada, March 3, 1922.

In such co-pending parent application, we describe and claim a form of film handling apparatus designed primarily for home, school, or other amateur use as contrasted to theatrical or professional use. In such apparatus, the circuits of the light source and of the driving motor are automatically broken under certain conditions; notably, when the gate is opened to a film threading position or when the parts of the apparatus are automatically placed in position for rewinding. Thereupon, in order to accomplish rewinding, the user must apply power by another operation, such as turning a switch or using an auxiliary handle. In the present application, we describe and claim a simplified form of apparatus in which the motor circuit and the light circuit remain continuously operative, and in which the rewinding is automatically accomplished after the user has moved the unitary control lever to one of a plurality of predetermined stations, such movement in itself being effective for opening the gate, stripping the film from the feeding means, and for rewinding the film. Similarly the movement of such lever to another pre-determined station brings the film into operative relation with the film moving means, actuates the take-up, and hence causes the film to be again projected, likewise with no further attention from the operator. The advantages of the apparatus disclosed and claimed herein include many of the advantages set forth in the above mentioned co-pending application and in addition the provision of an apparatus, with a minimum number of parts and with a control mechanism which in construction and operation is most simple.

An object of the present invention is to provide apparatus in which the movement of the one control handle to one station is effective for closing the gate, placing the film in operative relation with the film moving means, and operating the take-up spindle, and the movement of the same lever to another station is effective for removing the film bodily from the feeding means, rendering the take-up spindle mechanism inoperative, opening the gate, and operating the rewinding spindle whereby the film is automatically rewound thereupon without further attention from the operator.

In an alternative form of our invention, there is provided an intermediate station to which the control handle may be moved in which both the take-up and rewinding spindles are out of relation with the driving mechanism and the film out of relation with the moving means whereby one film may be easily removed from the apparatus or another film readily placed therein. In such alternative form or in the form in which there are two operating stations, we provide means preventing the accidental displacement of the control mechanism.

The objects of the present invention include the provision of a film handling apparatus in which the gate is constructed in two portions, one of which supports the film spools and is movable relatively to the other to close and open the film passage of the gate. The present apparatus also has as one of its objects the provision of means whereby the film is normally held in driven engagement with the film moving member but is removed therefrom by the opening of the gate. Other objects include the provision of simplified operating mechanism for the take-up and rewinding spindles and the provision of unitary control means for such mechanism, for the film gate, and for the film removing member.

It has been proposed alternately to actuate a taking-up or a rewinding spindle by the bodily movement of driving mechanism therefor. An object of the present invention is to provide mechanism effective for alternately projecting or rewinding a film as desired by means of the bodily movement of the film supporting members, such movement preferably being controlled by one handle, which also operates the gate, the means for placing the film in operative contact with the feeding means, and the means for removing the film from said feeding means.

Another object of the invention is to provide improved and simplified unitary control means for a pilot light and the regular projection light.

A further object is to provide improved means for bodily removing a film from a feeding member, together with improved control mechanism for such means.

A further object is to provide improved structure of a film handling apparatus and disposition of parts therein.

It will be readily understood that our invention can be applied broadly to any art in which material is fed through an apparatus and is particularly useful in connection with film handling apparatus whether for image bearing material adapted for use in a motion picture or stereopticon projector, or with a sound reproducing instrument, or with an apparatus adapted for the simultaneous reproduction of visual images and sound, or for light sensitive material adapted for use with a camera or sound recording apparatus.

Other objects, advantages and characteristics are apparent in the following specification, the accompanying drawings, and the subjoined claims. Although we are showing one preferred embodiment of our invention, it will be readily understood that we are not limited to this particular construction as changes can readily be made without departing from the spirit of our invention or the scope of our broader claims.

In the drawings:

Figure 1 is a side elevation of the apparatus partially in section, certain parts being omitted for clarity;

Figure 2 is a section taken on the line 2—2 of Figure 1 looking toward the front of the machine in the direction of the arrows;

Figure 3 is a plan view of the apparatus, with the casing shown in section;

Figure 4 is an enlarged detail view, corresponding to Figure 1, of a portion of the apparatus showing the gate and associated parts when in the open or film rewinding position;

Figure 5 is a partial enlarged plan view showing the operating mechanism for the sliding plate in the "gate open" or rewinding position in that form of the invention in which two separate stations are provided one for the projecting position and one for the rewinding position;

Figure 5a is a view similar to Figure 5 but showing the operating mechanism for the sliding plate in the "gate closed" or projecting position;

Figure 6 (sheet 2) is an enlarged detail view of the rear or movable portion of the gate looking toward the front face thereof;

Figure 7 is a sectional view on the line 7—7 of Figure 6 looking in the direction of the arrows and including a portion of the fixed gate section;

Figure 7a is a view taken on the line 7a—7a of Figure 7 looking in the direction of the arrows;

Figure 8 (sheet 4) is a view, corresponding to Figure 5a, showing a modified form of the invention in which a separate film threading station is also provided;

Figure 9 (sheet 3) is a wiring diagram of the apparatus.

We prefer to mount the apparatus within a case or cabinet, such cabinet including a rear wall 1, preferably attached to the base 2 of the case by the hinges 3, and a front door 4 through which access may be had to the apparatus for the purpose of placing a film in operative relation thereto and removing it therefrom. The main frame of the apparatus consists of such wall 1 and a main fixed plate 5 upon which a sliding or movable plate 6 is mounted. Such plate 5 is secured in spaced parallelism to the movable side 1 of the cabinet by means of pillars 7, preferably four in number. Between the feet 9 of such pillars 7 and the movable wall 1 of the cabinet, rubber washers 10 are inserted for the purpose of reducing noise. The feet are clamped upon these washers by screws 11 that pass through small rubber washers 12 and clear the holes in the feet so that there is no contact therebetween whereby vibration may be transmitted. In place of rubber, any suitable vibration damping substance may be used.

The sliding plate 6 is mounted upon the fixed plate 5 in a manner and for a purpose which later will become apparent. Upon such sliding plate 6 is mounted the rear or movable portion 13 of the gate, and the two spindles 15 and 16 which support the film spools 17 and 18. Also the light source 19, shown as an incandescent bulb, the condensing lens 20, and the reflector 21 are mounted upon the sliding plate 6 and move with it.

The front or fixed portion 14 of the gate, as will be apparent by reference to Figures 5 and 5a, is attached to and projects toward the operating door 4 from the fixed plate 5. It will therefore be understood that the disposition of the parts is such that sliding movement of the sliding plate 6 upon the fixed plate 5 causes the gate to be opened and closed, and when open gives access to the gate so that a film may be inserted between the sections thereof or removed from the space therebetween.

The film sprocket 23 is mounted upon the fixed plate 5 near the bottom of the gate, that is, the portion of the gate nearest the take-up spindle. As is clearly shown in Figure 7a, inter alia, a guiding and stripping shield or nose piece 25 is mounted upon the rear or movable portion of the gate, the free end of such member projecting forwardly, and being curved in a direction away from but corresponding to the curve of a cross section of the surface of the movable gate plate 13. The upper and lower portions of the movable gate section 13, as is clearly shown in Figure 7, are curved in a direction away from the face thereof whereby the initial positioning of the film by a lateral movement thereof is expedited. Such guiding and positioning member 25 is so positioned as to pass between the lower portion of the fixed gate section and the film sprocket 23.

The rear or movable section 13 of the gate has an opening 26, as is clearly shown in Figures 6 and 7, which allows the film sprocket to project therethrough when the gate is closed. Above and below this aperture are mounted guide rollers 27 and 28 by means of which, when the gate is closed, the film is wrapped around a portion of the periphery of the film sprocket so as to be drivingly engaged therewith. On the other hand, when the gate is opened, the film is drawn by the stripper or nose piece 25 clear of the sprocket and an open track is presented for the film through the gate and its associated parts.

Within the movable gate section 13 and the fixed gate section 14, there are provided apertures 30 and 31. The rear or movable portion 13 of the gate is provided with a relatively deep film track 32 for guiding the film. Attached to the fixed gate section 14 is the pressure plate 33 which is urged against the film guiding depression 32 as by the spring 34. It will thus be observed that the above described parts form a guide way or enclosed passage-way into which the film is initially guided and through which it is moved by means later described. The movable plate 13 is so shaped as to cooperate with such film guiding depression or tunnel when a film is pushed toward such part. Moreover, the guiding and stripping shield 25 is so shaped and positioned as to assist in the initial positioning of the film relative to such guiding depression 32 and the feeding sprocket 23 and to cooperate with the curved surfaces of the gate section 13 for such purpose.

The gate operating mechanism includes a shaft 37 carried in bearings 38 fixed to the sliding plate 6, one above and the other below the fixed plate 5. The said gate-opening shaft or lever 37 carries two crank arms 39 which engage the openings 40 in the said fixed plate 5 and project through apropriate openings in the movable plate 6. The lower end of the said shaft is bent to provide an operating handle 41. Such bearings 38 include projections 42 which cooperate with the taper 43 cut in the top and bottom edges of the fixed plate 5 whereby the sliding plate 6 is guided relatively thereto.

To the rear of the fixed plate 5 and between it and the support 1 which forms the back of the cabinet, that is on that side which is remote from the gate, is mounted the step-by-step feed mechanism and the driving mechanism therefor and for the shutter. The shutter 44 is carried upon a main operating shaft 45 upon which shaft is also mounted a spiral cam or "drunken screw" 46, which engages the star wheel 47 which is pinned to the shaft 48 which operates the sprocket 23. The shutter shaft is carried at its forward end in a ball-bearing 49 attached to the fixed plate 5 and its rear end is supported by a hollow centre formed eccentrically on a pin 50 that is rotatably mounted in a bracket 51 carried upon the fixed plate 5. The said pin 50 is pierced by a duct, one end of which communicates with the hollow forming the centre and the other end of which terminates in a suitable oiling device 52. As wear takes place on the shutter shaft 45 or in the step-by-step cam mechanism, rotation of the pin 50 forming the rear bearing for the shaft 45 serves to take-up the backlash; this bearing is, moreover, readily lubricated by means of the device 52 above referred to.

The paying out or re-winding spindle 15 is mounted in a suitable bearing 53 supported by the movable plate 6 and projects forwardly, or to the right as viewed in Figure 2, above the fixed plate 5. Similarly the taking-up spindle 16 is mounted in the bearing 54 supported by the movable plate 6 and projects forwardly or to the right as viewed in Figure 2, below the fixed plate 5.

The paying-out or rewinding spindle shaft 15 carries at one end a pinion 55 which, in the closed position of the gate, is entirely free, as is clearly shown in Figure 3, but which, when the gate is completely opened, as is clearly shown in Figure 4, is brought into engagement with a driving spur gear 56, which is mounted for rotation with a chain sprocket 57 over which an endless chain 58 passes, such chain, as is later described, being driven by the motor. Such sprocket and spur gear are mounted on an arm 59 which arm is loosely mounted upon the upper rear pillar 7 and controlled by the spring 60 which is coiled about the pillar 7 with one end fixed to the arm 59 and the other fixed to the foot 9 of the pillar. Hence the arm 59 is capable of a limited movement of rotation about an axis parallel to that of the spool spindles.

For driving the taking-up spindle 16 there is provided the driving sprocket 61 which is mounted for rotation upon the arm 62 which is pinned to the lower rear pillar 7 of the fixed plate 6. Such sprocket is operated by the aforesaid endless chain 58. Projecting backwardly, or to the left as viewed in Figure 2, from the spindle shaft 16, is the pin 63 parallel to the axis of rotation of such spindle 16 and serving to engage with an oppositely directed pin 64 projecting from the sprocket 61. When the gate is in the open position, for rewinding or film threading, such pins 63 and 64 are out of contact, but when the gate is closed such pins engage and serve to transmit power which operates the taking-up spindle.

The aforesaid endless chain 58 is operated by the sprocket 65 which is loosely mounted upon the shaft 66 and driven yieldingly through the spring 67, which is coiled about the shaft 66.

The objective lens 69 is carried on the fixed plate 5 forward of the gate, being mounted in a bracket 70 that is slidable in said plate under the control of a lever 72 extending downwardly from the plate towards the base 2 of the cabinet.

Outside such base, a lever 73 is connected by a short shaft 74 (Figure 2) to a corresponding lever 75 on the inside, such lever 75 being slotted to receive the tail of the lever 72.

Near the bottom of the hinged side 1 of the case by means of the strap 76 is mounted an electric motor 77 for driving the projector. Upon the forward or right hand end of the armature shaft as viewed in Figure 3 is a driving pulley 78 connected by a belt with a pulley 79 on the front end, or right hand end as viewed in Figure 3, of the operating shaft 45. The driving shaft 66, which alternately drives the take-up or rewinding spindle, is driven by the shaft 45 through the skew gears 80 and the spring 67.

A fan 81 is mounted upon an extension of the armature shaft of the motor enclosed in an outlet housing 82 having an opening at its bottom communicating through an opening in the bottom of the cabinet with the outer air. The opening of the inlet housing 83 is positioned at the rear of the projection lamp 19. No light, therefore, escapes either through the inlet or the outlet for air and the discharge of the inlet duct in close proximity to the lamp ensures efficient cooling. A transparent window 84 is provided in line with the optical train whereby dust is prevented from entering the cabinet. If desired, such window may be made openable to remove the slight obstruction to light caused by its passage through a sheet of glass.

An operating handle 85 (shown in position in Figures 1 and 4) is provided as an alternative means of driving the projector. Such handle is adapted to engage a pin in the free end of the cross shaft 66 carrying the chain sprocket 61 and meshing with the main operating shaft 45 through the skew gears 80.

To the base 2 of the cabinet is conveniently attached the motor switch 86 and the double pole switch 87 which controls the main projecting light source 19 and an auxiliary pilot light 88 conveniently positioned in a corner of the cabinet and having a reflector 89 for directing light upon the gate and its associated parts. When the switch 87 is moved to one position, it turns the projection light on and the pilot light off, and when moved to the other position, it turns the projection light off and the pilot light on. A general control switch 90 for both the motor and light circuits, is conveniently placed in the cord leading from the house outlet to the cabinet.

The film spools 17 and 18 may be mounted in protective casings 92 and 93 which are connected by the fixed plate 94, in accordance with United States Letters Patent Number 1,100,591 granted June 16, 1914, to Ferdinand Von Madaler, or in a hinged magazine, such as shown and claimed in United States Letters Patent Number 1,440,173, granted December 26, 1922, to us, or in any other preferred form of magazine. If used in such magazine, one end of the film will be permanently attached to the spool 17 and the other end to the spool 18. If desired, conventional open spools may be employed.

To operating stations for the movable plate 6 and the parts controlled by the movement thereof may be provided, as is clearly shown in Figures 5 and 5a. The flat spring 96 is attached to the fixed plate 5 and at its free or left hand end as viewed in Figure 5, carries the rounded detent block 97 which, when the handle 41 has been moved to the right hand or forward position shown in Figure 5, engages the depression 98 in the fixed plate 6 retaining the parts in the rewinding position. When the handle 41 has been moved to the left hand or rearward position shown in Figure 5a, the detent block 97 cooperates with the depression 99 to hold the parts in the projection position.

To operate the apparatus, the user places the control handle 41 in the forward position, as shown in Figure 4, thus opening the gate. He places the magazine upon the spindles 15 and 16, the film being guided into the gate and the film track 32 by the rounded surfaces of the movable gate section 13 and the guiding and stripping shield 25, such shield also serving to guide the film into cooperative position relative to the sprocket. Thereupon he moves the handle 41 to the rearward position, as shown in Figure 1, thus moving the movable plate 6 forwardly and with it both film spools and placing the film in cooperation with the driving sprocket 23, the rollers 27 and 28 serving to hold the film in driven engagement with the sprocket. This movement likewise brings the pins 63 and 64 into operative relation thus coupling the take-up spindle 16 and the motor 77.

The user first turns on the switch 90, the light switch 87 preferably being in the position shown in Figure 9, thus illuminating the pilot lamp 88. After the gate has been closed and the film brought into relation with the sprocket 23, he may turn on the motor switch 86 and move the light switch 87 to the position wherein it connects the projection light with the source of current. If desired, however, the motor switch may be made operative before the gate is closed, for it has been found entirely practical to place the film into relation with the spindles 15 and 16 during the operation of the spindle 15, in a rewinding direction, and with the sprocket 23 while the sprocket is in motion.

At the conclusion of the film projecting operation, the user moves the control handle 41 forwardly thus moving the movable plate 6 backwardly and through the operation of the stripping member 25 removing the film from the sprocket 23 and bringing the driven pinion 55 into relation with the driving gear 56 which is continuously driven, as previously described, while the motor 77 is in operation. Owing to the mounting of the arm 59 by means which include the spring 60 sufficient bodily movement of the gear 56 is permitted to insure its easy and proper contact with the pinion 55. Thus the spindle 15 is rotated in a re-winding direction and the film re-wound thereupon. At the conclusion of the rewinding operation the yielding drive of the rewinding spindle through the gear 56 and the spring 64 and their associated parts prevents the end of the film being torn loose from the reel upon the take-up spindle 16. After the completion of re-winding, the user may stop the motor by opening the switch 86, or if he desires he may remove the film from the machine without stopping the motor since the yielding nature of the drive of the spindle 15 permits such operation. During the rewinding of the film, the projection lamp may be extinguished thus protecting the film from the heat of the light source.

Or, if desired, the magazine may be removed before the film has been rewound, after the film has been projected.

An alternative construction is shown in Figure 8. The depression 100, placed between the depressions 99a and 98a in the fixed plate 6a provides a neutral or film threading station. When the detent block 97a mounted upon the spring 96a is moved into cooperation with such depression the gate is largely open, the stripper has operated to remove the film from the sprocket but the take-up and the re-winding clutches or power couplings are both in a neutral position and the film without tension.

If the user wishes to use the conventional open reel, he merely places it upon the supply or re-winding spindle 15, laying the free end of the film over the gate 13 and into the guiding depression 32 and attaches the free end to the take-up spindle 16. Thereupon he moves the handle 41 to the rear, or to the left as viewed in Figure 4, and the operation of the apparatus is as previously described. If desired, automatic endwise threading of the film through the apparatus may be employed, since the intermediate or film threading position, in which the gate is locked, and the stripping and protective element for the feeding sprocket, and the control of the power applying means in combination with the operation of the gate from and to such position, and in combination with the operation of the protective element, well lend themselves to such use, in further combination with whatever additional conventional structure may be convenient or necessary therefor.

When the user turns off the projection light 19 through the double pole switch 87, he immediately actuates the pilot light 88 which is so positioned as to throw light upon the gate and its associated parts. When he is ready to project, he throws the switch to the other position illuminating the projection light and extinguishing the pilot light.

To operate the projector to show a succession of still or stereopticon pictures, a pin 101 is attached to the pulley 79 on the main operating or shutter shaft 45 which pin cooperates with the pin 102 attached to the single picture operating button 103 mounted in the front of the cabinet and normally urged out of operative position by the spring 104. When the user wishes to show single pictures, he merely pushes the button 103 inwardly and rotates it, thus driving the sprocket and take-up spindle.

In the apparatus as herein shown, no provision is made for compensating for the differences in characteristics of movement of the continuously moving mass of film upon the supply and take-up reels and the intermittent movement of the sprocket. With a relatively short film of light weight and with a relatively weak source of illumination, as is practicable under certain conditions for home use, no such compensation is necessary. When a longer and heavier film is to be employed, or a light source of greater intensity, an automatic loop setting or tension controlling mechanism, of any desired or conventional type, may be introduced.

When it is desired to inspect, clean, oil, or repair the apparatus, the rear side 1 is merely rotated on the hinges 3 thus rendering the apparatus and all the parts thereof easily accessible. It will be readily understood that such construction renders the original assembly of the apparatus simple, easy and inexpensive, and permits ready replacement. If desired, the side 1 may be attached by screws or thumb-nuts instead of the hinges 3. As the hinged side 1 is moved back into position, the moulding 8 and the forwardly facing surface of the abutting surface of the base 2 adjacent the hinge 3 form an effective stop. As the side 1 is placed in operative position, the lens controlling lever 72 engages with the slotted tail of the lever 75, and the pins 101 and 102 are positioned cooperatively.

Certain of the advantages of our invention are stated above or are evident from the foregoing portion of this specification. Other advantages include the provision of a film handling apparatus which is extremely simple and inexpensive to build, assemble and operate, and the provision of an improved control mechanism, locking means therefor, stripper, and pilot light for such an apparatus.

We claim:

1. Film handling apparatus comprising a casing, a movable supporting frame, means for mounting said frame upon said casing for movement between a first position wherein it is disposed within said casing and a second position wherein it is disposed without said casing, a pair of film receiving spindles, a member for feeding a film from one of said spindles to the other, mechanism for driving at least one of said spindles and said member, said spindles said member and said mechanism being mounted upon said frame for bodily movement therewith, and means for driving said mechanism, said means being supported by said casing and so positioned relatively to said frame and said mechanism so mounted thereupon that the movement of said frame from said first to said second position removes said mechanism from operative and driven relation with said means and the movement of said frame from said second to said first position places said mechanism in operative and driven relation to said means.

2. Film handling apparatus comprising a casing, said casing being provided with an opening, a hinged cover for closing said opening, a pair of film receiving spindles, a member for feeding a film from one of said spindles to the other, mechanism for driving at least one of said spindles and said member, said spindles said member and said mechanism being mounted upon said cover for bodily movement therewith, and means for driving said mechanism, said means being supported by said casing and so positioned relatively to said cover and said mechanism so mounted thereupon that the movement of said cover to a position wherein it closes said opening brings said mechanism into operative and driven relation with said mechanism and the movement of said cover from said position destroys such operative relation and moves said mechanism spindles and member to a position outside of said casing wherein said spindles mechanism and member are easily accessible.

3. Film handling apparatus comprising a casing, a supporting frame, means for mounting said frame upon said casing for movement between a first position wherein it is disposed within said casing and a second position wherein it is disposed without said casing, a pair of film receiving spindles, a member for moving a film from one of said spindles to the other, and mechanism for driving at least one of said spindles and said member, a motor for operating said mechanism, said spindles said member said mechanism and said motor being mounted upon said frame for movement therewith, and manual means for driving said mechanism, said means being supported upon said casing and so positioned relatively to said frame and said mechanism so mounted thereupon that the movement of said frame from said first to said second position removes said mechanism from driven and operative relation to said mechanism and the movement of said frame from said second position to said first position replaces said means in such operative relation to said mechanism.

4. In a film handling apparatus, a casing, said casing comprising a fixed section and a hinged section, said fixed section being provided with an opening and said hinged section being mounted upon said fixed section for movement from and to a position wherein it closes said opening, a pair of film receiving spindles, a member for moving a film from one of said spindles to the other, driving mechanism for said member and at least one of said spindles, and a motor for driving said mechanism, said spindles said member said mechanism and said motor being mounted upon the inward side of said hinged section and movable therewith, the movement of said hinged section to a position wherein said casing is opened being effective to move said motor, spindles, member and mechanism outside of said casing wherein they are available for adjustment, inspection and cleaning, and manual means for operating said mechanism for limited periods, said means including a driven member operatively connected to said mechanism and a driving member so mounted upon said fixed section that the movement of said hinged section to close said opening is effective to bring said driving and driven members into operative relation one with the other whereby when said spindles said member said mechanism and said motor are positioned in operative relation within said casing said manual means is available for alternatively driving said mechanism.

5. In a film handling apparatus, a supporting casing provided with an opening, a movable cover for closing said opening, a film feeding member disposed within said casing, a rotatable shaft for driving said feeding member mounted upon the inside of said cover for bodily movement therewith, an element for driving said shaft mounted for revolution with said shaft, a rotatable driving member mounted upon said casing and having a formation rotatable therewith and extending therefrom into the interior of said casing, said formation and said driving element being so positioned relatively to each other that when said cover is moved to the position wherein it closes said opening said element and said formation are brought into operative relation one with the other, whereby said shaft and hence said feeding member are driven by the rotation of said driving member.

6. In a film handling apparatus, a supporting casing provided with an opening, a hinged cover for closing said opening, a film feeding member disposed within said casing, a rotatable shaft for driving said member mounted upon said cover for bodily movement therewith, a member for driving said shaft mounted for revolution with said shaft, a pin for operating said revoluble member extending therefrom in a direction parallel to said shaft, a rotatable driving member mounted upon the exterior of said casing, a pin rotatable therewith and extending therefrom into the interior of said casing, said pins being so positioned relatively to each other that when said cover is moved to the position wherein it closes said opening said pins are brought into operative relation one with the other, whereby said shaft and hence said feeding member are driven by the rotation of said driving member.

7. In a film handling apparatus, two spaced film moving members between which a film extends, means for applying power to one of said members whereby the film is moved thereby, an openable gate disposed between said members through which the film extends, said gate including a fixed section and a section movable relatively thereto between three positions; namely a first or film feeding position in which said movable section is disposed relatively closely to said fixed section and the film pressed thereby into engagement with both of said sections, a second or film rewinding position wherein said movable section is disposed relatively distantly from said fixed section, and a third or film threading position intermediate said first and second positions, locking means for holding said gate in said third or intermediate position, and control mechanism operatively interconnecting said power applying means and said movable gate section and including devices for moving said movable gate section between said positions and into said third position and into operative relation with said locking means and for concomitantly disconnecting said power-applying means.

8. In a film handling apparatus, two spaced film moving members between which a film extends, means for applying power to one of said members whereby the film is moved thereby, an openable gate disposed between said members through which the film extends, said gate including a fixed section and a section movable relatively thereto between three positions; namely a first or film feeding position in which said movable section is disposed relatively closely to said fixed section and the film pressed thereby into engagement with both of said sections, a second or film rewinding position wherein said movable section is disposed relatively distantly from said fixed section, and a third or film threading position intermediate said first and second positions, locking means for holding said gate in said third or intermediate position, and control mechanism operatively interconnecting said power applying means and said movable gate section and including devices for moving said movable gate section into said third position and into operative relation with said locking means and for maintaining said power-applying means inoperative, and for moving said movable gate section from said third or intermediate position and into said first position and for rendering said power applying means operative.

9. In a film handling apparatus, two spaced film moving members between which a film extends, means for applying power to one of said members whereby the film is moved thereby, an openable gate disposed between said members through which the film extends, said gate including a fixed section and a section movable relatively thereto between three positions; namely a first or film feeding position in which said movable section is disposed relatively closely to said fixed section and the film pressed thereby into engagement with both of said sections, a second or film rewinding position wherein said movable section is disposed relatively distantly from said fixed section, and a third or film threading position intermediate said first and second positions, locking means for holding said gate in said third or intermediate position, and control mechanism operatively interconnecting said power applying means and said movable gate section and including devices for moving said movable gate section into said first position and for rendering said power-applying means operative and for moving said movable gate section from said first position into said third position and into operative relation with said locking means and for rendering said power-applying means inoperative.

10. In a film handling apparatus, two spaced film moving members between which a film extends, means for alternatively applying power to each of said members, an openable gate disposed between said members through which the film extends, said gate including a fixed section and a section movable relatively thereto, a first or film feeding gate station into which said movable section may be disposed wherein said movable section is positioned relatively closely to said fixed section and the film pressed thereby into engagement with both of said sections, a second or film rewinding gate station into which said movable section may be disposed wherein said movable section is positioned relatively distantly to said fixed section, a third or film threading gate station wherein said movable section is positioned intermediate said first and second stations, locking means for said movable gate section cooperating with each of said gate stations respectively, a support for said movable gate section, means for moving said support so that said gate section is moved between said three stations and into and out of operative relation with each of said locking means, and control mechanism operatively interconnecting said moving means and said power applying means for operating both of said means.

11. In a film handling apparatus, two spaced film moving members between which a film extends, means for alternatively applying power to each of said members, an openable gate disposed between said members through which the film extends, said gate including a fixed section and a section movable relatively thereto, a first gate station into which said movable section may be disposed wherein said movable section is positioned relatively closely to said fixed section and the film pressed thereby into engagement with both of said sections, a second gate station into which said movable section may be disposed wherein said movable section is positioned relatively distantly to said fixed section, a third gate station wherein said movable section is positioned intermediate said first and second station, locking means for said movable gate section cooperating with each of said gate stations respectively, a support for said movable gate section, means for moving said support so that said movable gate section is moved between said three stations and into and out of operative relation with each of said locking means, and mechanism operatively interconnecting said power applying means and said moving means for operating both of said means, said control mechanism including devices for applying power to one of said members when said movable gate section is disposed at said first station and devices for applying power to the other of said members when said movable gate section is disposed at said second station.

12. In a film handling apparatus, two spaced film moving members between which a film extends, means for applying power to said members, an openable gate disposed between said members through which the film extends, said gate including a fixed section and a section movable relatively thereto, a first or film feeding gate station into which said movable section may be disposed wherein said movable section is positioned relatively closely to said fixed section and the film pressed thereby into engagement with both of said sections, a second or film rewinding gate station into which said movable section may be disposed wherein said movable section is positioned relatively distantly to said fixed section, a third or film threading gate station wherein said movable section is positioned intermediate said first and second stations, locking means for said movable gate section cooperating with each of said gate stations, a support for said movable gate section, means for moving said support so that said gate section is moved between said three stations and into and out of operative relation with said locking means, and mechanism operatively interconnecting said power applying means and said moving means for operating both of said means.

13. In a film handling apparatus, an openable sectional gate, said gate including a fixed section and a section movable relatively thereto, means for moving the film through said gate between the sections thereof, a first gate station at which said movable section may be disposed wherein said movable section is positioned relatively closely to said fixed section and the film pressed thereby into engagement with both of said sections so that said sections hold the film firmly during a film feeding operation, a second gate station at which said movable section may be disposed wherein said movable section is positioned relatively distantly to said fixed section so that the film is given a maximum of play between said sections and subjected to a minimum of engagement therewith, a third gate station at which said movable section may be disposed wherein said movable gate section is positioned between said first and second gate stations so that the film is guided and its movement angular to its feeding path between said sections relatively limited during the initial positioning thereof in the apparatus, locking means for said movable gate section cooperating with each of said gate stations, means for applying power to said moving means, a support for said movable gate section, means for moving said support so that said gate section is moved between said three stations and into and out of operative relation with said locking means, and mechanism operatively interconnecting said power applying means and said moving means for operating both of said means.

H. G. PONTING.
GEORGE WILLIAM FORD.